United States Patent
Ünal et al.

(10) Patent No.: US 10,866,907 B2
(45) Date of Patent: Dec. 15, 2020

(54) EVICTION PRIORITIZATION FOR IMAGE PROCESSING

(71) Applicants: Apical Ltd, Cambridge (GB); Arm Limited, Cambridge (GB)

(72) Inventors: Metin Gokhan Ünal, Gamston (GB); Kushan Vijaykumar Vyas, Cambridge (GB); Robert Shorter, Cambridge (GB); Mario Jose David Manzano, Cambridge (GB)

(73) Assignee: Apical Ltd., Cambridge (GB)

( * ) Notice: Subject to any disclaimer, the term of this patent is extended or adjusted under 35 U.S.C. 154(b) by 31 days.

(21) Appl. No.: 16/242,912

(22) Filed: Jan. 8, 2019

(65) Prior Publication Data
US 2019/0213141 A1      Jul. 11, 2019

(30) Foreign Application Priority Data

Jan. 10, 2018  (GB) .................................. 1800406.9

(51) Int. Cl.
*G06F 12/12* (2016.01)
*G06F 12/121* (2016.01)
*G06T 1/60* (2006.01)
*G06F 12/122* (2016.01)

(52) U.S. Cl.
CPC .............. *G06F 12/121* (2013.01); *G06T 1/60* (2013.01); *G06F 12/122* (2013.01); *G06F 2212/1021* (2013.01); *G06F 2212/1044* (2013.01)

(58) Field of Classification Search
CPC ........ G06F 12/121; G06F 12/122; G06T 1/60
USPC ......................................................... 711/133
See application file for complete search history.

(56) References Cited

U.S. PATENT DOCUMENTS

| | | | |
|---|---|---|---|
| 2015/0193907 A1* | 7/2015 | Agarwal | G06T 1/60 345/557 |
| 2017/0148130 A1* | 5/2017 | Fishwick | G06T 1/20 |
| 2019/0095331 A1* | 3/2019 | Diamond | G06F 12/0848 |

OTHER PUBLICATIONS

Combined Search and Examination Report dated Jun. 25, 2016 for GB Application No. GB1800406.9.

\* cited by examiner

*Primary Examiner* — Than Nguyen
(74) *Attorney, Agent, or Firm* — EIP US LLP

(57) ABSTRACT

A method comprising, in an image processing operation, identifying location data indicative of a read path for the image processing operation, the read path at least partly traversing a block of pixels of an image. Parameter data relating to a characteristic of the read path in the context of the block is generated from the location. Storage prioritization data is associated with the block at least partly on the basis of the parameter data. The storage prioritization data is for determining whether block data representative of the block is to be evicted from storage.

20 Claims, 3 Drawing Sheets

---

100 — Identify location data indicative of a read path at least partly traversing a block of pixels of an image

102 — Generate, from the location data, parameter data relating to a characteristic of the read path in the context of the block

104 — Associate storage prioritization data with the block at least partly on the basis of the parameter data

EVICTION PRIORITIZATION FOR IMAGE PROCESSING

CROSS-REFERENCE TO RELATED APPLICATIONS

This application claims priority to GB Application No. GB1800406.9, filed Jan. 10, 2018, under 35 U.S.C. § 119(a). The above-referenced patent application is incorporated by reference in its entirety.

BACKGROUND OF THE INVENTION

Technical Field

The present invention relates to methods for use with storage and to a storage management system.

Background

A known cache replacement algorithm for identifying items of a cache to remove from the cache to create space for new data is the Least Recently Used (LRU) algorithm. The LRU algorithm relies on an assumption that items of the cache that have been used most recently in the past will probably be used again before those items that have been used least recently, for example if it is assumed that the items that have been used least recently have already been processed and will not be needed again. The LRU algorithm therefore removes least recently used items first. However, the LRU algorithm may not always select the optimal items for removal from the cache. For example, items selected for removal using the LRU algorithm may be needed relatively soon after eviction, for example in cases in which items are read periodically. These removed items must then be fetched subsequently from other memory, such as a main memory, which may be less efficient to access.

SUMMARY

According to a first aspect of the present disclosure there is provided a method comprising, in an image processing operation: identifying location data indicative of a read path for the image processing operation, the read path at least partly traversing a block of pixels of an image; generating, from the location data, parameter data relating to a characteristic of the read path in the context of the block; and associating storage prioritization data with the block at least partly on the basis of the parameter data, the storage prioritization data being for determining whether block data representative of the block is to be evicted from storage.

According to another aspect of the present disclosure there is provided a storage management system for communicating with storage for an image processing operation, the storage management system comprising at least one processor and being operable to: identify location data indicative of a read path for the image processing operation, the read path at least partly traversing a block of pixels of an image; generate, from the location data, parameter data relating to a characteristic of the read path in the context of the block; and associate storage prioritization data with the block at least partly on the basis of the parameter data, the storage prioritization data being for determining whether block data representative of the block is to be evicted from the storage.

BRIEF DESCRIPTION OF THE DRAWINGS

Further features will become apparent from the following description, given by way of example only, which is made with reference to the accompanying drawings.

DETAILED DESCRIPTION

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Figure 1:
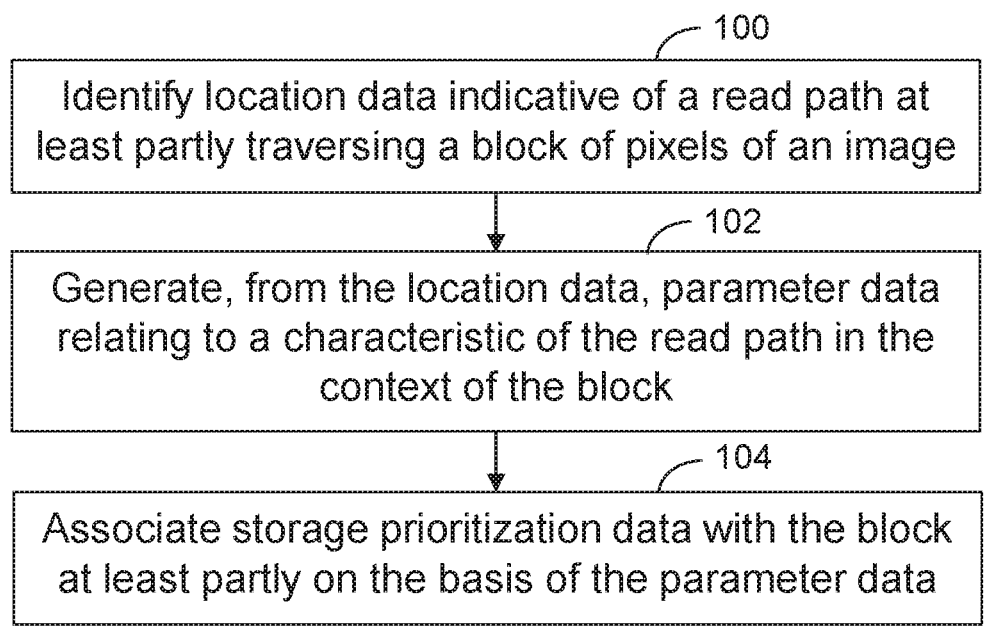
FIG. 1 is a flow diagram illustrating a method according to examples.

FIG. 1 is a flow diagram showing a method according to examples described herein. At item 100 of FIG. 1, location data indicative of a read path for an image processing operation is identified. The read path at least partly traverses a block of pixels of an image. The location data for example represents locations within a block at which a pixel value is to be calculated as part of the image processing operation. For example, the image processing operation may be an operation to transform the image. For example, the image processing operation may include a distortion processing operation to alter a distortion of the image, for example to correct or reduce geometric distortion in the image. Examples of location data and an image processing operation are described further below with reference to FIGS. 2a and 2b and an example of a read path is shown schematically in FIG. 3.

At item 102 of FIG. 1, parameter data is generated from the location data. The parameter data relates to a characteristic of the read path in the context of the block, such as a relationship between the read path and the block path. The parameter data may aim to capture an estimate of a quantity of the block that has not yet been used or accessed as part of the image processing operation.

At item 104 of FIG. 1, storage prioritization data is associated with the block at least partly on the basis of the parameter data. The storage prioritization data is for determining whether block data representative of the block is to be evicted from storage. For example, if the parameter data indicates that a large proportion of the block has already been used as part of the image processing operation, it may be less likely that the block is needed for subsequent processing as part of the image processing operation. On the other hand, if the parameter data indicates that a small proportion of the block has been used, and a large proportion of the block remains unused (for example unread or unaccessed), it may be more likely that the block is used subsequently as part of the image processing operation.

A storage prioritization value represented by the storage prioritization data may be assigned a value based on the parameter data to indicate an estimate of the likelihood that the block will be needed subsequently for use in the image processing operation. If it is likely that the block will be needed subsequently (for example if a small proportion of the block has been used), the storage prioritization value may be assigned a value to indicate that the block has a relatively high priority for retention within the storage. Conversely, if it is unlikely that the block will be needed subsequently (for example if a large proportion of the block has already been used), the storage prioritization value may be assigned a value to indicate that the block has a relatively low priority for retention within the storage. Blocks may then be evicted from the storage based on their storage prioritization values, for example to evict lower priority blocks, which are less likely to be needed subsequently, in preference to higher priority blocks.

The method of FIG. 1 therefore typically allows blocks that are likely to be needed subsequently in the image processing operation to be identified, and block data representative of these blocks to be retained within the storage. The storage is for example a cache memory, from which the block data may be accessed more rapidly than other memories (such as a main memory). By storing the block data in the storage, the block data may therefore be accessed more quickly than otherwise. With the method of FIG. 1, block data for blocks that are identified as being less likely to be needed subsequently in the image processing operation may be evicted from the storage, for example to make space in the storage for other data, which may have a higher chance of being used subsequently. This can further improve the speed of implementing the image processing operation.

Figure 2A:
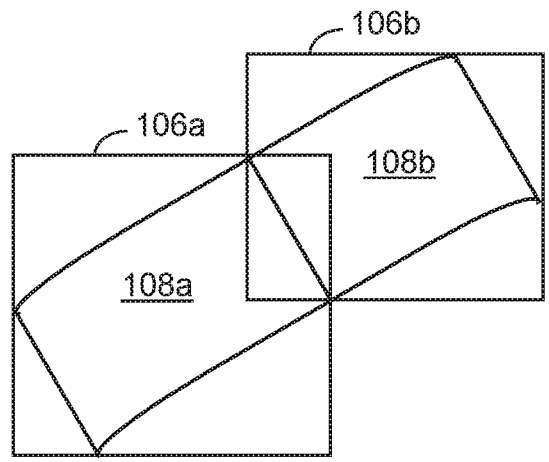
FIGS. 2a and 2b illustrate schematically an example of a mapping between input blocks of an input image and output blocks of an output image.
Figure 2B:
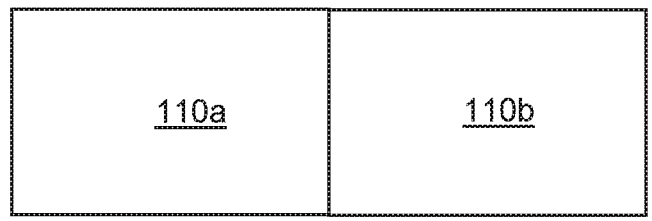

FIGS. 2a and 2b provide an example of an image processing operation with which the methods described herein may be used. FIGS. 2a and 2b relate to an image processing operation including geometric distortion correction processing to transform an image. Such processing may be used to correct or reduce geometric distortion in an image. For example, certain lenses can be used to capture images or videos with a wide field or angle of view. A fisheye lens is a wide-angle lens that can be used to capture wide panoramic or hemispherical images. Such lenses typically produce a distorted image, with certain parts of the image stretched or compressed compared with other parts. This generally leads to straight image features, such as straight lines, appearing curved rather than straight. A mapping between input blocks of an input image and output blocks of an output image, such as that shown in FIGS. 2a and 2b, can be used to remove or reduce curvature of straight image features, thereby reducing geometric distortion in an image.

FIG. 2a illustrates schematically two input blocks 106a, 106b of an input image. Each of the input blocks 106a, 106b, includes a respective portion 108a, 108b of the input image. In this example, due to the curvature of the input image because of the wide-angle lens used for capturing the input image, the portions 108a, 108b of the input image are also curved. However, the input blocks 106a, 106b in this example correspond to blocks of input pixels, which are rectangular in shape, rather than the curved set of pixels of the portions 108a, 108b. This is because the input image in examples is read into memory or storage in a line-by-line manner. It is therefore more straightforward to save rectangular input blocks (sometimes referred to as tiles) rather than the portions themselves, which may be irregularly shaped. An input image may typically be divided into a plurality of blocks of pixels, which may be partly overlapping (as in the example of FIG. 2a) or non-overlapping. For example, in FIG. 2a, the input blocks 106a, 106b are overlapping due to the curvature of the input image and the rectangular shape of the input blocks 106a, 106b.

Each of the portions 108a, 108b of the input image corresponds to a respective output block 110a, 110b of an output image, which are illustrated schematically in FIG. 2b. The output blocks 110a, 110b may for example have a fixed, non-overlapping shape, size and location, for example to reduce distortion or curvature of straight image features in the output image. For example, images may suffer from barrel distortion, pincushion distortion and moustache distortion. With barrel distortion, magnification in an image decreases with increasing distance from an optical axis so that it appears as if the image has been mapped onto a convex curved surface such as the surface of a barrel. In contrast, with pincushion distortion, magnification in an image increases with increasing distance from an optical axis, for example so that the image appears to have been mapped to a concave or inwardly curved surface. Moustache distortion is typically a combination of barrel distortion and pincushion distortion, such as barrel distortion in a central region of the image and pincushion distortion in an outer region of the image. For predetermined output blocks 110a, 110b, the corresponding input blocks 106a, 106b may be calculated using a functional mapping. The functional mapping may be derived from an interpolation based on the respective output locations in the output frame and a function representing a given transformation, which is for example a geometric transformation between the input image and the output image. For example, the interpolation may be used to calculate a non-integer input location in the input image corresponding to an integer output location (where an integer location typically corresponds with a pixel position in an image and a non-integer location typically corresponds with a position between pixels in an image). The transformation may depend on an image capture device used to capture the input image, as the image capture device typically affects the type of distortion, such as barrel distortion, pincushion distortion or moustache distortion, the input image suffers from, and therefore the distortion to be corrected by the transformation. For example, fisheye lenses may capture images with barrel distortion, so as to map an object captured across a wide angle of view to a narrower image area. For example, the transformation may be a panoramic transformation, a cylindrical transformation, or a stereographic transformation, although other transformations are possible. The function may be a continuous function that represents a predetermined or desired correction or adjustment to be applied to the input frame to correct or adjust the geometric distortion of the input frame. Alternatively, the function may be discontinuous or empirical, which may be based on a geometric mapping of locations in the output image to corresponding locations in the input image. In this way, a set of input locations in the input image corresponding to respective output locations in the output image can be identified and the input blocks including these input locations can also be identified.

After obtaining an input location for an output location of an output block, a corresponding pixel value for that input location can be derived. In examples, the pixel value for the input location is based on an interpolation based on pixel data associated with pixels surrounding the input location in the input image, which may for example be a bicubic interpolation using at least one polyphase filter. The pixel value for the input location can then be associated with the output location in the output image. The pixel data may for example be obtained as from block data representative of the input block of the input image. The pixel data used for calculating the pixel value may not necessarily include all of the block data. For example, the pixel data may correspond with a subset of input locations within the block that includes the input location for which the pixel value is to be derived. This may reduce storage and processing requirements.

As can be seen from FIG. 2a, in examples such as these, the input locations at which a value is to be calculated may not be located on a straight line. Instead, these input locations may be located along a curve, due to the curvature of the input image. In view of the relatively irregular pattern of input locations at which a pixel value is to be calculated, which may be a curved pattern, conventional cache replacement algorithms such as the LRU algorithm may not operate efficiently. Indeed, as explained above, the LRU algorithm evicts least recently used items first. However, in examples involving periodically using the same items of a cache, such as for the correction of geometric distortion in an image, items may actually be more likely to be used imminently if they have been used least recently. Thus, the LRU algorithm may identify poor candidates for eviction from storage, such as from a cache, and may be relatively inefficient.

Instead, as explained with reference to FIG. 1, methods described herein involve identifying location data indicative of a read path for an image processing operation, such as a distortion processing operation to alter a distortion of the image. Such a distortion processing operation may for example be used to adjust the amount or type of distortion to an image (which may be a distorted image or an undistorted image, such as an image in which straight lines of a scene remain straight in the image of the scene). For example, inverse distortion may be applied to a rectilinear image (which may be considered an undistorted image) to cancel out lens distortion. For example, lenses of a virtual reality (VR) headset may apply pincushion distortion to an image. In such cases, barrel distortion (which is the opposite to pincushion distortion) may be applied to an undistorted image rendered by a processing system. After undergoing barrel distortion, the VR headset may then apply pincushion distortion to the image, which may cancel out the previously-applied barrel distortion to obtain an undistorted image. An example of a distortion processing operation is geometric distortion correction, which may be used to reduce geometric distortion of an image.

Figure 3:
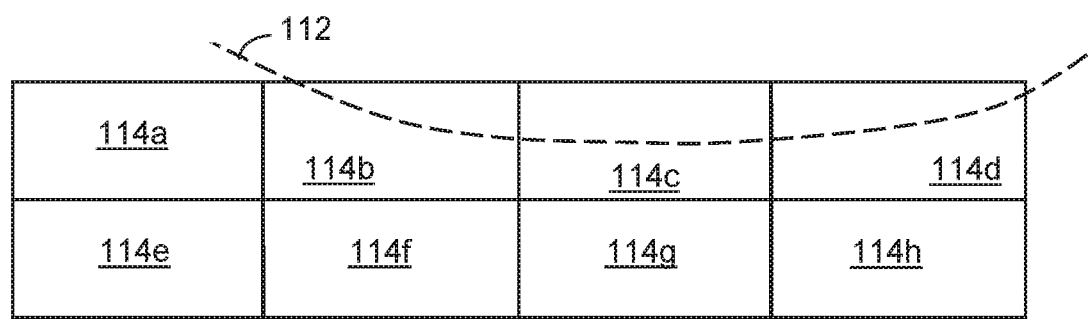
FIG. 3 illustrates schematically a read path according to examples.

An example of a read path 112 is shown schematically in FIG. 3. The read path 112 of FIG. 3 is shown as traversing a plurality of blocks of an image. The blocks of FIG. 3 are labelled with the reference numeral 114, appended by a letter from "a" to "h". The location data corresponding to the read path 112 is for example representative of at least one location within the image at which a respective pixel value is to be calculated, for example using block data representative of at least one of the blocks of the image. For example, the locations corresponding to the read path 112 may correspond to input locations of an input image at which a pixel value is to be calculated, to be associated with a corresponding output location of an output image. Hence, the read path 112 typically is not a physical path across an image. For ease of understanding, though, a read path 112 may be considered to include or represent locations at which a pixel value is to be calculated. For example, an image processing operation may include a sequence of requests for the calculation of pixel values at a sequence of locations within an image. This sequence of locations may together be taken to correspond to the read path 112. In other words, the read path 112 may have a direction as well as a shape, which may correspond with the order in which pixel values for the locations corresponding to the read path 112 were requested. The read path 112 may therefore change over time (for example, increasing in length as an increasing number of requests for the calculation of pixel values are received). In general though, the read path 112 is uni-directional and does not reverse in direction or go back on itself.

The read path 112 may not be a continuous path. Instead, the read path 112 may include a subset of locations across at least part of the image, which may be joined together by the read path 112. Alternatively, the read path 112 may be considered to correspond to a route across at least part of the image that generally models or mimics the locations at which a respective pixel value is to be calculated.

The read path 112 need not cross entirely from one side of an image (or a block) to an opposite side of the image (or block). Instead, the read path 112 may traverse merely part of the image (or block). For example, the read path 112 may enter along a side of a block and may exit along the same side of the block.

Although in FIG. 3 the read path 112 is illustrated as generally transverse (in other words, passing in a generally side-to-side direction), in other examples the read path 112 may instead be generally longitudinal (in other words, passing in a generally lengthwise direction). Furthermore, while the read path 112 of FIG. 3 is curved, in other examples the read path 112 may be straight or may have an irregular shape.

In examples such as FIG. 3, each block includes a portion of an image to be processed. For example, a block may be represented by block data which represents pixel values of pixels within the block. The pixel values are for example representative of an intensity value of each pixel, and may be stored separately for each colour channel of an image (in examples in which the image is a colour image). Although the blocks 114a-114h of FIG. 3 are shown as rectangular and each of the same size and shape as each other, in other examples, some or all of the blocks may be of a different shape than rectangular and some of the blocks may have a different shape and/or size than others. Moreover, as can be seen from FIG. 2a, in some cases some or all of the blocks may overlap at least one other block.

Methods in examples herein include generating, from the location data, parameter data relating to a characteristic of the read path in the context of a block at least partly traversed by the read path. The characteristic for example provides an indication of the likelihood of the block being used again for subsequent processing as part of the image processing operation. For example, the parameter data may relate to an area of the block between a boundary of the block and the read path. The boundary of the block is for example a lower boundary of the block. For example, the area may be representative of an area that has not yet been processed as part of the image processing operation (in examples in which the image is processed in raster order, such as from a top of the image in a downwards direction). For example, before identifying the location data, methods described herein may involve identifying, in raster order, at least one previous set of location data, each corresponding to a respective previous read path at least partly traversing the block. The read path may therefore divide the block into a first portion on a first side of the read path and a second portion on a second side of the read path. The first side may for example correspond with a portion of the block which has not yet been processed as part of the image processing operation. In such cases, the characteristic may be representative of or based on an area of the first portion of the block, which is for example the area of the block which has not yet been processed as part of a raster scan. In examples in which the image is processed in raster order, the read path may correspond to a scan line of a raster scan, which may take any shape, such as curved or straight. In other words, each scan line may correspond to a different respective read path.

If a given block has a large area that has yet to be processed, the block may be retained in the storage as it may be more likely that the block is needed for subsequent processing as part of the image processing operation. Conversely, if a large area of the block has already been processed, it is less likely that the block will be needed subsequently. Block data representative of the block may therefore be given a relatively low priority for retention within the storage, so it may be discarded from the storage if more space is needed for block data representative of other blocks that are more likely to be needed subsequently.

In examples, a block may be requested periodically from storage. For example, when the image is scanned using a raster scan, a plurality of scan lines (which may each correspond to a respective read path) may sequentially cross the block in a line-by-line pattern. For example, with reference to FIG. 3, the blocks 114b, 114c, 114d may be read from the storage as part of the read path 112. A subsequent read path (not illustrated in FIG. 3) may have a similar shape to the read path 112 but may be located in a different position with respect to the image. For example, a subsequent read path may be located beneath the read path 112 in the image. In cases such as this, the blocks 114b, 114c, 114d may be read again as part of the subsequent read path. In other words, the blocks 114b, 114c, 114d may be read repeatedly from the storage. For example, the blocks 114b, 114c, 114d may be read periodically from the storage, such as at regularly occurring intervals for example corresponding to scan lines of a raster scan, or at variable time intervals. With the LRU algorithm, the block 114b may for example be evicted from the storage as the block 114d is processed as part of the read path 112 (as the block 114b may be the LRU item at that time). However, the block 114b may then be requested subsequently as part of the subsequent read path. If the block 114b has already been evicted from the storage, the block 114b may be retrieved from further storage which is less efficient or slower to access, such as main memory. Thus, in examples such as this, the LRU algorithm may be less efficient than the methods described herein, which may for example retain the block 114b in the storage for use in the subsequent read path allowing it to be read more efficiently. For example, the methods described herein may improve the efficiency of retrieval of data from storage in examples in which the data (such as block data representative of a block of pixels of an image) is requested or retrieved repeatedly from the storage.

Figure 4:
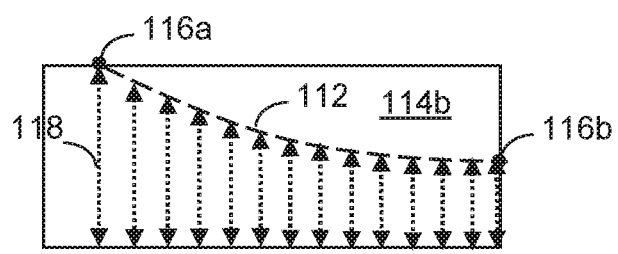
FIG. 4 illustrates schematically an approximation of an area between a boundary of a block and a read path according to examples.

The characteristic, which is for example indicative of the likelihood of a block being used again for subsequent processing, may be exactly equal to the area beneath the read path 112, for example where the read path 112 may be modelled as a function and the area beneath the read path 112 calculated for example by integration. In other examples, though, it may be more efficient or less computationally expensive to approximate the area. In these examples, the method may include calculating a plurality of distances between the boundary of the block and a respective location of a plurality of locations represented by the location data, and combining the plurality of distances to approximate the area. FIG. 4 shows schematically an example such as this.

FIG. 4 shows a block 114b of FIG. 3 in further detail, illustrating the read path 112 at least partly traversing the block 114b. The read path 112 enters the block 114b at a first location 116a and exits the block at a second location 116b. The read path 112 in this example also includes twelve locations between the first and second locations 116a, 116b at which respective values are to be calculated. In this example, a distance is calculated for each of the locations along the read path 112, for example as:

$$d = H - \mathrm{mod}(l_i, H) \quad (1)$$

where d is the distance, H is the height of the block 114b, $l_i$ is location i along the read path 112 and the mod operator (which represents the modulo operation) finds the reminder after division of $l_i$ by H. $l_i$ and H are for example taken in the same direction, such as along the same axis. In the example of FIG. 4, $l_i$ and H are measured along a vertical axis, although other axes may be used in other examples. These distances are shown in FIG. 4 with dashed arrows, one of which is labelled with the reference numeral 118. The direction in which $l_i$ and H are measured may depend on the direction of the read path 112. For example, if the read path 112 crosses in a generally lengthways direction across the block 114b (such as from top to bottom or vice versa), the direction in which $l_i$ and H are measured may be taken along a horizontal axis.

In yet further cases, the direction in which $l_i$ and H are measured may depend on a scan pattern according to which locations are identified, for reading from the storage. For example, there may be a series of read paths including the read path 112. This series of read paths may be considered to follow a raster order, with each read path corresponding to a scan line of a raster scan, as noted above. While typically a raster scan involves systematically covering an area (such as locations of an input image at which a value is to be calculated) generally from top to bottom, one scan line at a time, in some cases the raster scan lines may progress from bottom to top or from one side of the image to the other (i.e. transversely across the image).

In cases in which the image is processed in raster order, the distance may be calculated according to the following pseudo-code:

```
function [distance]=calculate_distance (cx, cy, direction, block)
  switch direction
    case 0
      d=mod(H−cy, H);
    case 1
      d=mod(cx, W);
    case 2
      d=mod(cy, H);
    case 3
      d=mod(W−cx, W);
``` where cx is the x-coordinate of a location for which the distance d is to be calculated, cy is the y-coordinate of a location for which the distance d is to be calculated, direction is the direction of the scan pattern, block includes block parameters of the block 114b such as the block height H and the block width W, case 0 is the case in which the scan pattern is in a downwards direction with respect to the block 114b, case 1 is the case in which the scan pattern is in a leftwards direction with respect to the block 114b, case 2 is the case in which the scan pattern is in an upwards direction with respect to the block 114b and case 3 is the case in which the scan pattern is in a rightwards direction with respect to the block 114b.

It is to be appreciated that these expressions for the calculation of the distance are merely examples and other expressions may be used in other examples. For example, the distance may be calculated as a difference between H and Distances calculated in accordance with these expressions can be combined, for example by summing them or otherwise accumulating them, to approximate the area beneath the read path 112. For example, the area beneath the read path 112 may be calculated, using equation (1) to calculate each distance, as:

$$A = \Sigma_{l_1}^{l_2} H - \mod(l_i, H) \qquad (2)$$

where A is the area, and the sum is from the first location 116a, referred to as $l_1$, which is the location at which the read path 112 enters the block 114b, to the second location 116b, referred to as $l_2$, which is the location at which the read path 112 exits the block 114b. For example, the sum includes contributions from each of the locations along the read path 112 at which a value is to be calculated, between and including the first and second locations 116a, 116b. Combining the distances in this way typically produces a similar result to an integration beneath a curve (or line) corresponding to the read path 112.

This calculation may be performed iteratively. For example, each of the locations may be identified sequentially. The distance may be calculated as the locations are identified and, once a distance for a new location is calculated, this distance may be added to the sum of the previous distances for the previous locations along the read path 112. Performing the calculation in this way may be straightforward or efficient to implement in hardware. Alternatively, though, these distances may be calculated after each of the locations has been identified, in one operation.

In other examples, the parameter data may relate to a different characteristic of the read path in the context of the block than the area of the block between the boundary of the block and the read path. For example, the parameter data may relate to an entry location or exit location of the read path through the block. For example, if locations of the block 114b are identified in an order corresponding to a scan pattern including a plurality of read paths, it may be approximated from the entry location how much of the block 114b has not yet been read and therefore the likelihood that the block 114b will be used imminently for further processing. For example, if the scan pattern is in a downwards direction, such as a series of read paths going from a top of the block 114b to the bottom of the block 114b, in order, it may be determined that, for a first read path with a higher entry location in the block 114b, a larger proportion of the block 114b has not yet been processed than for a second read path with a lower entry location in the block 114b. Accordingly, the block 114b may be given a higher priority for retention in the storage with the first read path than the second read path.

As described above, storage prioritization data is associated with the block at least partly on the basis of the parameter data. The storage prioritization data is for determining whether block data representative of the block is to be evicted from storage. The storage prioritization data may represent a storage prioritization value, which may be used to determine whether to evict the block data from the storage. For example, the storage prioritization value may be considered to correspond to a priority value indicative of how likely it is that the block will be needed subsequently and thus the priority for retaining the block data in the storage.

In a simple example, the storage prioritization value may be equal to a parameter value represented by the parameter data, such as the area, the entry location or the exit location. However, typically, the storage prioritization value is determined based on processing of the parameter value. For example, the area may be normalized based on a scaling factor representative of an average scaling applied to the image comprising the block (such as a mean scaling applied to the image). The scaling applied to the image for example corresponds to a difference in size of the image initially and at a later stage of the image processing operation, such as before the calculation of pixel values associated with respective output locations for an output image, which may be represented as a ratio of an initial and a later size of the image. For example, where an image is reduced in size, this may be considered to correspond to downscaling of the image. Conversely, where the image is increased in size, this may be considered to correspond to upscaling of the image. By normalizing the storage prioritization value in this way, this may ensure that the storage prioritization values are not unduly high for upscaled images (where the distances are for example larger than for downscaled or smaller images), which could reduce the effectiveness of the storage prioritization value. For example, two image calculation modules (described further with reference to FIG. 5) may share the same storage. In such examples, each of the image calculation modules may be used to process two separate images with a different respective resolution, but storing blocks of these two images in the same storage. In cases such as this, if one of the image calculation modules is downscaling input images (such as input frames) on average and the other image calculation module is upscaling input images on average then there may be a large difference between the parameter value or storage prioritization value for these two image calculation modules if the parameter value or storage prioritization value is not normalized.

The storage prioritization value, P, may be calculated for example as:

$$P = \text{floor}\left(\frac{A + F_{norm}}{2}\right) \qquad (3)$$

where A is the area as referred to above, which may be calculated for example using equation (2). $F_{norm}$ is a scaling factor for normalizing the area, and the floor function may be used to limit the storage prioritization value to a predetermined maximum value.

In this example, $F_{norm}$ may be calculated for example as:

$$F_{norm} = \frac{l_{in}^{size}}{l_{out}^{size}} \qquad (4)$$

where $l_{in}^{size}$ represents the size of an input image and $l_{out}^{size}$ represents the size of an output image derived from the input image. These sizes may for example correspond to an area of the input and output images, respectively. The scaling factor may therefore be a global scaling factor. In other examples, though, the scaling factor may be a local scaling factor (for example representing a scaling in a limited area or region of the image).

The floor function in this case limits the storage prioritization value to a maximum of 254. However, in other cases, different maximum values may be used for the storage prioritization value, or the storage prioritization value may not be capped in this way. Limiting the storage prioritization value in this way for example provides a more linear distribution for lower area values, where the storage prioritization value may have a larger impact, as these blocks may be more likely to be evicted from the storage than blocks with higher area values (and higher storage prioritization values).

A table illustrating storage prioritization values based on an area of the block that is unprocessed for a given read path (such as an area of the block between the read path and a boundary of the block) is shown below in Table 1 for an example in which the scaling factor is one.

TABLE 1

Dependence of storage prioritization value on area.

| Area | Storage prioritization value |
|---|---|
| 100+% | 254 |
| 100% | 254 |
| 80% | 254 |
| 70% | 254 |
| 60% | 230 |
| 50% | 192 |
| 40% | 153 |
| 30% | 115 |
| 20% | 76 |
| 10% | 38 |
| 0% | 0 |

In general, a block traversed at least partly by a read path, such as the block 114b of FIG. 4 may be locked from eviction from storage while pixel values corresponding to locations along the read path are being calculated. For example, at this time, it is typically necessary to retrieve some or all of the block data representative of the block 114b from the storage in order to calculate these pixel values. It is therefore undesirable to discard the block 114b from the storage, as the block 114b would then have to be retrieved from other storage (such as main memory, which is typically slower to access), which may reduce the efficiency of the image processing operation.

Hence, the storage prioritization data may be associated with the block after reading of data from the storage in accordance with the read path, such as after reading of the block data from the storage in accordance with the read path. This may for example prevent the block from being evicted from the storage during reading of the data associated with the read path. In other words, the block may be locked from eviction while it is likely to be needed (in this example, while the data associated with the read path is read, which typically includes at least some of the block data). For example, the block may be locked from eviction while the block data representative of the block is being read. After the read path has exited the block the block data may then unlocked. This may prevent the block data from being evicted from the storage while it is being read, which may cause corrupt or incorrect data to be read from the storage.

After reading of the block data from the storage in accordance with the read path, an unlock signal indicative that the block data is evictable from the storage may be generated. This unlock signal may be used to indicate that the block data may not be evicted from the storage as it is not being read or used at present. However, block data is typically not evicted merely in response to an unlock signal being generated. Instead, the block data may be retained in the storage until it is needed to create space in the storage for the storage of further data. At that point, the block data may be evicted from the storage depending on the storage prioritization value represented by the storage prioritization data. This is explained further with reference to FIG. 5, which shows schematically internal components of a system 120 including a storage management system and a storage system according to examples.

Figure 5:
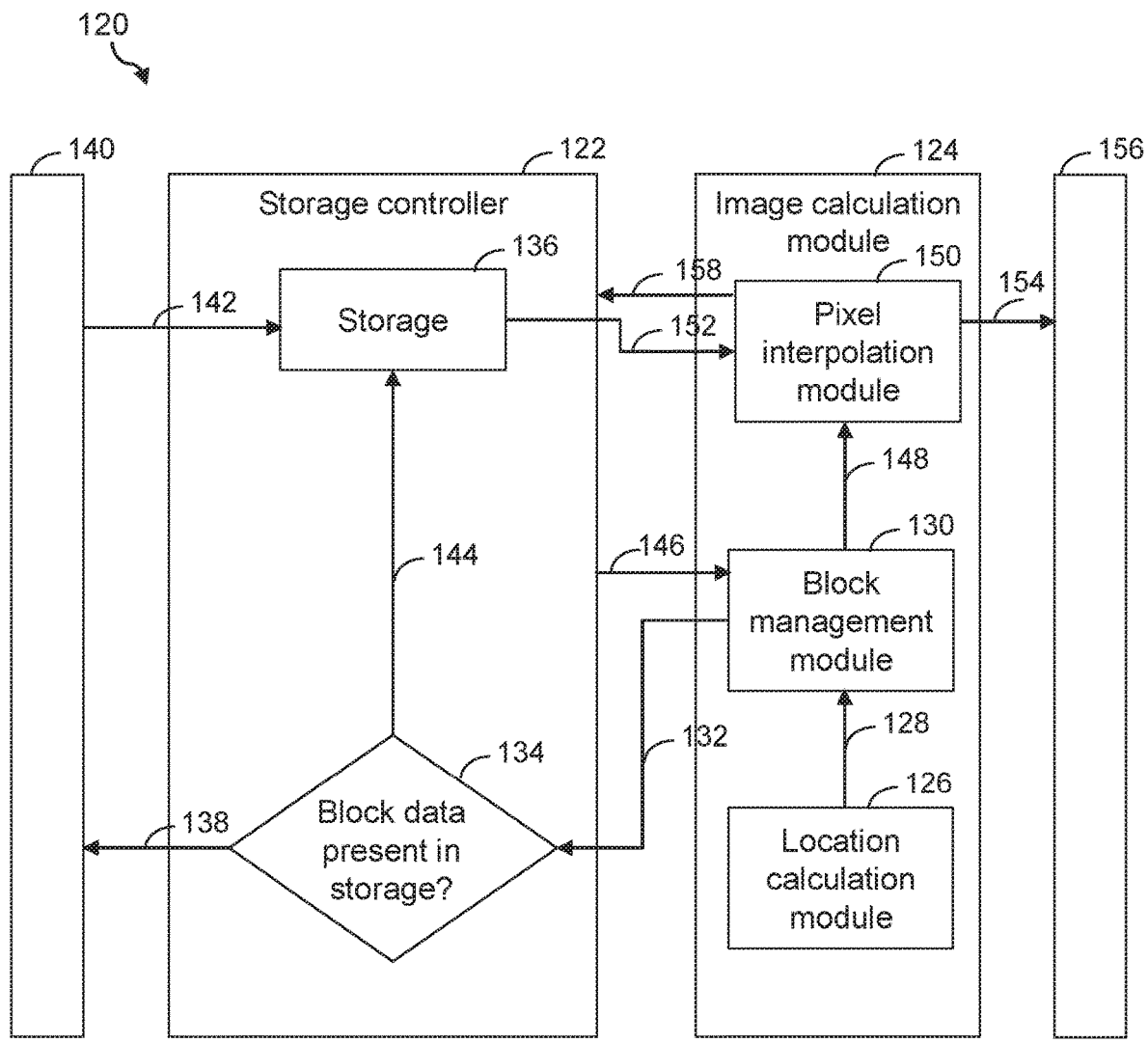
FIG. 5 illustrates schematically internal components of a system including a storage management system and a storage system according to examples.

The storage management system of FIG. 5 includes a storage controller 122 and an image calculation module 124 for calculating pixel values at locations in an input image which for example correspond to output locations in an output image. The image calculation module 124 for example may be used as part of an image processing operation, such as a distortion processing operation such as a geometric distortion correction processing operation. In examples such as that of FIG. 5, an image processing system may therefore include at least some, for example all, of the components of the storage management system.

The storage management system includes at least one processor (not shown separately in FIG. 5), for example for implementing the storage controller 122 and the image calculation module 124. The at least one processor may include a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The at least one processor may be or include a graphics processing unit (GPU). A processor may also be implemented as a combination of computing devices, e.g., a combination of a DSP and a microprocessor, a plurality of microprocessors, one or more microprocessors in conjunction with a DSP core, or any other such configuration.

Typically, the at least one processor may be configured to perform the functions of the storage controller 122 and the image calculation module 124. In examples, the storage management system may include computer program instructions configured to, when processed by the at least one processor, implement the storage controller 122 and the image calculation module 124. The computer program instructions may be in any suitable format or language, for example in machine code, an assembly language or a register transfer language (RTL). The instructions may for example be included in a configuration bit stream for configuring the storage management system to implement a desired method of processing an input image. Such instructions may be stored in any storage accessible to the storage management system.

The components of the storage management system in the example of FIG. 5 are interconnected using a systems bus (not shown in FIG. 5). This allows data to be transferred between the various components.

A location calculation module 126 of the image calculation module 124 calculates a location in an input image, which in this example is to be corrected for geometric distortion. This location for example corresponds to an output location in an output image for which a value is to be calculated, as described with reference to FIGS. 2a and 2b. The location calculation module 126 may be operable to calculate a plurality of locations in the input image. For example, the plurality of locations may be calculated sequentially or in order, and may represent a read path which at least partly traverses a block of pixels of the input image. In other words, the location calculation module 126 is configured to identify location data indicative of the read path. Thus, identification of the location data as described herein may be considered to encompass the generation of the location data or retrieval or obtaining of the location data, for example from another module or storage than those shown in FIG. 5. Although in FIG. 5 the location data is calculated by the location calculation module 126, in other examples, location data may be calculated by other components of the storage management system 120.

The location data 128 may be in any suitable format for representing a location or position within an image. For example, the location data 128 may represent a coordinate corresponding to the location. Such a coordinate may be in a predetermined coordinate system, such as the Cartesian coordinate system. Axes of the coordinate system may correspond with edges of an image. For example, a corner of the image (such as the bottom left corner) may correspond with an origin of the coordinate system. The coordinate system may be a normalized coordinate system, which may be normalized to a size of the image. For example, the axes of the coordinate system may span a distance from 0 to 1. This may simplify the processing of images of different sizes.

The location data 128 is transferred to a block management module 130. The block management module 130 is for example configured to interface with the storage controller 122 to request block data for the calculation of the value at the location represented by the location data 128. The block management module 130 in this example converts the location coordinates to a block identifier for the block including the location. For example, the block identifier may be a block index indicative of the block or block coordinates identifying a position of the block within the image. The block management module 130 then sends a request 132 for block data representative of the block including the location to the storage controller 122. The request 132 for example includes the block identifier, allowing the storage controller 122 to retrieve the block data representative of the block.

Upon receipt of the request 132, the storage controller 122 determines whether the block data for the block is present in storage 136. The storage controller 122 may be any module, element, component or circuitry that controls access to storage, such as a storage system, which in this example includes the storage 136 and at least one further storage 140, and may be referred to as a memory controller, memory chip controller (MCC) or a memory controller unit (MCU).

The storage controller 122 may be a separate or stand-alone module or chip or the storage controller 122 may be integrated with another module or chip as part of a larger system, such as a larger system-on-a-chip. For example, the storage controller 122 may be part of or integrated with an image processing system or data processing system, with a control module that receives and parses a configuration bit stream and controls other elements or components of the image processing system based on the instructions of the configuration bit stream. In this case, the storage controller 122 may be part of the control module, or the control module may perform the function of the storage controller 122.

In this example, the storage 136 is a cache memory for storage of the block data after retrieval of the block data from further storage of the storage system (such as a main memory) during an image processing operation, and from which the block data is evictable during the image processing operation. A cache is for example a memory for storing data to enable more rapid retrieval of the data in the future. For example, a cache may store a duplicate of data that is also stored in a main memory but may be a smaller or faster memory, located closer to a processor, than the main memory. Thus, it may take less time to access data from the cache than from the main memory. For example, a cache may be a volatile memory. The cache may be or include a Random Access Memory (RAM) of the storage management system or an embedded Dynamic Random Access Memory (eDRAM), which may be integrated on the same chip as other components of the storage management system. For example, the cache may include static RAM, which may be accessed more rapidly than dynamic RAM as static RAM generally does not need to refreshed (unlike dynamic RAM). The storage 136 may be local storage of the storage management system (in this example, local storage of the storage controller 122), although in other examples, the storage 136 may be external to the storage management system. For example, the storage 136 may be on-chip storage of the storage management system. The storage 136 may, however, be any suitable local memory of or accessible to the graphics processor.

If the block data is not present in the storage, a request 138 is sent to further storage 140, which is external to the storage management system. Together, the storage 136 and the further storage 140 may be considered to form a storage system from which the block data may be retrieved. The further storage 140 may be system storage, for example primary storage, or a main memory of a host system running an image processing system including the image processing operation. The further storage 140 may be or include at least one of volatile memory, such as a Random Access Memory (RAM), for example Static RAM (SRAM) or Dynamic RAM (DRAM) and non-volatile memory, such as Read Only Memory (ROM) or a solid state drive (SSD) such as Flash memory. The further storage 140 may include further storage devices, for example magnetic, optical or tape media, compact disc (CD), digital versatile disc (DVD) or other data storage media. The further storage 140 may be removable or non-removable from an image processing system including the storage management system. Typically, though, the further storage 140 is slower to access, and to retrieve data from, than the storage 136.

The request 138 may be transmitted to the further storage 140 via a memory subsystem, which may for example be interconnected between the storage controller 122 and the further storage 140 via a bus. The bus may be or include any suitable interface or bus. For example, an ARM® Advanced Microcontroller Bus Architecture (AMBA®) interface, such as the Advanced eXtensible Interface (AXI), may be used.

In response to the request 138, block data 142 is received from the further storage 140 and is transferred to the storage 136. The block data 142 may be transferred to the storage 136 via a reordering buffer (ROB), which may be used to reorder data received from the further storage 140 so it is transferred to the storage 136 in the same order as it was initially requested from the further storage 140. Such reordering may be omitted in some cases, though. The block data 142 may then be stored in the storage 136.

In other examples in which the storage 136 already includes the block data 142, the request 132 for the block data 142 may be transmitted 144 from the block management module 130 to the storage 136 directly, without first being transmitted to the further storage 140.

Once the block data 142 is stored in the storage 136 (or once it has been determined that the storage 136 includes the block data 142), the storage controller 122 of FIG. 5 transmits a response 146 to the block management module 130 providing block address data indicative of an address of the block data in the storage 136. The storage controller 122 may for example include an address generation unit (AGU), sometimes referred to as an address computation unit (ACU), for calculating the address of the block data. The address of the block data for example indicates where the block data is physically stored within the storage 136. Where the storage 136 includes a plurality of storage banks, the address may further indicate in which storage bank the block data is stored.

The block management module 130 then transmits a request 148 to a pixel interpolation module 150 of the image calculation module 124 to calculate a pixel value corresponding to the location represented by the location data, using block data at the address in the storage 136 represented by the block address data. For example, the request 148 may include the location data and the block address data.

The pixel interpolation module 150 of FIG. 5 subsequently retrieves the block data 152 from the storage 136, for example by accessing the block data stored at the address represented by the block address data. The pixel interpolation module 150 may retrieve the entirety of the block data, representing the entire block. Alternatively, the pixel interpolation module 150 may retrieve a portion of the block data, such as a portion of the block data representing a portion of the block including the location represented by the location data. For example, the portion of the block data retrieved from the storage 136 may be sufficient for calculation of the pixel value corresponding to the location represented by the location data, without including extraneous block data that is not needed for this calculation. This may improve the efficiency of the storage management system, as it may be more efficient to retrieve and/or transfer a portion of the block data rather than the entirety of the block data.

The pixel interpolation module 150 then calculates the pixel value corresponding to the location represented by the location data. For example, the pixel interpolation module 150 may use pixel values representative of four (or more) pixels which surround the location and interpolate these pixel values to obtain a pixel value for that location, which may be associated with an output location in an output image. Pixel data 154 representative of the pixel value is then transferred to output storage 156. The output storage 156 may for example be a buffer, such as first-in-first-out (FIFO) buffer, for temporarily storing the pixel data 154 before transferring the pixel data 154 to other components of the image processing system. For example, pixel values may be calculated for each output location of an output block of an output image (with each output location corresponding to a respective input location of the block represented by the block data). These pixel values may be written to the output storage 156, for example via an AXI write master. It is typically not necessary to indicate the pixel output coordinates during the writing of the pixel values to the output storage 156 as the output pixels are typically written in raster order. The output storage 156 may be arranged to store pixel values for incomplete output blocks and the storage system may also include further output storage for storing complete blocks (not shown in FIG. 5), to which data for complete output blocks may be written to further improve the efficiency of the storage management system. For example, instead of writing data relating to incomplete output blocks in single transactions, complete, or full, bursts may be written to the further output storage, relating to complete output blocks.

In the example of FIG. 5, the pixel interpolation module 150 is arranged to generate, from the location data, parameter data relating to a characteristic of the read path in the context of the block and associate storage prioritization data with the block at least partly on the basis of the parameter data. In other examples, though, these functions may be performed by other components of a storage management system such as that of FIG. 5.

For example, upon reading the block data (or the portion of the block data) the pixel interpolation module 150 may calculate the parameter data. For example, the block data retrieved by the pixel interpolation module 150 may include sufficient information about the block to allow the characteristic of the read path in the context of the block to be determined. The block data retrieved may include block parameter data representative of parameters of the block such as a size, e.g. a width and/or height, of the block. From this, the parameter data may be generated. For example, where the scan pattern is from top to bottom and the block parameter data includes a height of the block, the distance between a particular location and a boundary of the block may be calculated for example using equation (1) or case 0 of the pseudo-code above. This distance may be added to a sum of previous distances calculated for previous locations for which an output value is to be calculated to obtain an area beneath the read path, for example using equation (2) above. In other words, the parameter data may be recalculated for each subsequent location for which a pixel value is to be calculated, for example by incrementing a previously-calculated area by the distance between the location for which the pixel value is to be calculated and the boundary of the block. In other examples, though, the parameter data may be generated for a plurality of locations together, rather than sequentially or incrementally.

The storage prioritization data may then be generated based at least partly on the parameter data, for example using equation (3) above. The storage prioritization data in the example of FIG. 5 is generated by the pixel interpolation module 150. However, in other examples, the storage prioritization data may be calculated by other components of a storage management system such as that of FIG. 5, and may be calculated by the same component as or a different component than the component configured to calculate the parameter data.

The storage prioritization data may then be associated with the block. In the example of FIG. 5, the storage prioritization data is associated with the block by transferring a response 158 from the pixel interpolation module 150 to the storage controller 122. The response 158 of FIG. 5 includes the storage prioritization data and the block address data identifying the position of the block within the storage 136. In this way, the storage prioritization data is associated with the block stored at the block address represented by the block address data.

In examples such as FIG. 5, the storage controller 122 is operable to receive the storage prioritization data after reading of data from the storage in accordance with the read path. For example, in cases such as this, the response 158 may be sent after the read path has exited the block rather than while the read path is still within the block. For example, the response 158 may be sent after it has been determined that a location for which a corresponding pixel value is to be calculated is outside the block (such as within a further block of the image). In this way, the storage prioritization data may not be associated with the block until the block has finished being processed as part of a scan line including the read path. This may therefore avoid eviction of the block from the storage 136 while the block data representative of the block is still being read from the storage 136.

The response 158 may include an unlock signal (although in other examples an unlock signal may be sent separately from the storage prioritization data or an unlock signal may be omitted, for example where the storage prioritization value represented by the storage prioritization data indicates whether a block is unlocked for eviction or not). For example, the storage controller 122 may receive an unlock signal indicative that the block data is evictable from the storage 136.

After receipt of the unlock signal at the storage controller 122, the storage controller 122 may update a record of block data stored in the storage 136 and a storage prioritization value associated with each respective piece of block data. For example, the storage controller 122 may include a storage control structure for storing the storage prioritization data and block identifier data indicative of the block the storage prioritization data is associated with. The storage control structure may be in any suitable format for storing records and indicating relationships between different entries. For example, the storage control structure may be in the form of a table, database or list of records. The storage control structure may store solely block data and storage prioritization data for blocks that are unlocked for eviction. Alternatively, though, the storage control structure may store block data and storage prioritization data for all blocks stored in the storage 136, regardless of whether the blocks are evictable.

In examples, the storage controller 122 may, upon receipt of the unlock signal, reduce at least one further storage prioritization value for further storage prioritization data representative of at least one further block of pixels of the image. For example, the further storage prioritization data may also be stored in the storage control structure. The at least one further block of pixels may be at least one further block including at least one location that was read from the storage during a previous scan. By reducing the at least one further storage prioritization value, the at least one further storage prioritization value may be degraded over time, for example with increasing scans of the image. This may reduce the likelihood of the at least one further block being retained indefinitely in the storage 136 (as the chance of the at least one further block being needed imminently may also reduce over time).

Reducing the storage prioritization value may include performing a bit shift operation on the storage prioritization data. A bit shift operation for example involves operating on a bit pattern representing the storage prioritization value (for example by operating on the storage prioritization data represented as a binary numeral) at the level of individual bits. For example, a division by a factor of two (to reduce the storage prioritization value) can be implemented by moving the series of bits representative of the storage prioritization value by one or more positions. As a simple example, if the storage prioritization value may be represented in binary by 11 (i.e. the number 4 in decimal), a bit shift of 1 to the right can be used to obtain the binary numeral 01 (i.e. the number 2 in decimal), thereby dividing the storage prioritization value by a factor of two. Such a bit shift operation can be used to reduce the storage prioritization value, for example by dividing the storage prioritization value by a factor of two, in a hardware efficient manner, as a bit shift operation can typically be performed more rapidly by a processor than other types of operation such as divisions that cannot be performed by a bit shift operation. References herein to division by a factor of two are to be taken as referring to division by two or by a factor of 2n, where n is an integer. It is to be appreciated, though, that the storage prioritization value may be reduced differently in other examples though.

In examples when the image to be processed is a frame of a video, the storage prioritization value may also be reduced after the frame has been processed, for example upon receipt of an end of frame signal. For example, the storage prioritization value may be reduced to a minimum value, such as 0, for all block data stored in the storage, indicating that the block data related to that frame may be evicted from the storage once new data (such as new block data relating to a subsequent frame) is received. Furthermore, if any block data is still locked from eviction (and is therefore unavailable for eviction from the storage), an unlock signal may be sent to the storage to unlock any locked block data at the end of a frame. Again, this may allow this block data to be evicted to create room in the storage for new block data relating to the subsequent frame.

In general, the block data may be retained in the storage 136 where the storage 136 has sufficient storage capacity for storing the block data. For example, if the storage 136 is never full, the block data may be stored in the storage 136 indefinitely. Typically, though, the storage 136 may reach capacity during an image processing operation. For example, the storage controller 122 may be operable to determine whether the block data is to be evicted from the storage 136 in response to receiving further data, and identifying that a size of the further data is larger than an available storage capacity of the storage 136. If this is the case, some data of the storage 136 may be removed from the storage 136 to make space for storage of the further data in the storage 136.

The storage controller 122 in FIG. 5 is operable to determine whether the block data is to be evicted from the storage 136 at least partly on the basis of the storage prioritization data. For example, the storage controller 122 may be operable to determine that a storage prioritization value represented by the storage prioritization data is smaller than further storage prioritization values represented by further storage prioritization data associated with at least one further block represented by further block data stored in the storage 136, and, in response, determining that the block data is to be evicted. For example, the storage controller 122 may identify which block has the lowest storage prioritization value and evict the block data associated with that block from the storage 136. Multiple blocks may be evicted similarly, for example by evicting a plurality of blocks with the lowest storage prioritization values to create room for storage of the further data in the storage 136.

The above examples are to be understood as illustrative examples. Further examples are envisaged. For example, although in the examples above the methods and systems are described in the context of an image processing operation for correcting distortion of an image, it is to be appreciated that these are merely illustrative examples to aid understanding. In other examples, the methods and systems described herein may be used in other contexts or as part of other image processing operations.

It is to be appreciated that the methods described herein may be used with still images or with images that represent a video. For example, an image that may be processed as described herein may be a frame of a video.

In examples described herein, pixel values may be calculated sequentially for a sequence of locations in an image. However, in some cases, a plurality of pixel values may be calculated simultaneously or within the same clock cycle. For example, a pixel interpolator module such as that of FIG. 5 may calculate two pixel values for two different locations during one clock cycle. In such cases, a characteristic which the parameter data relates to may be based on a combination of respective characteristics of each of the locations. For example, a distance between each of the locations and a boundary of a block including the locations may be calculated separately for each of the locations and combined, for example by summing the calculated distances.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A method comprising, in an image processing operation:
    identifying location data indicative of a read path for the image processing operation, the read path at least partly traversing a block of pixels of an image such that the read path divides the block into a first portion on a first side of the read path and a second portion on a second side of the read path;
    generating, from the location data, parameter data relating to an area of the first portion of the read path, between a boundary of the block and the read path; and
    associating storage prioritization data with the block at least partly on the basis of the parameter data, the storage prioritization data being for determining whether block data representative of the block is to be evicted from storage.

2. The method according to claim 1, wherein the parameter data relates to an approximation of the area and the method comprises:
    calculating a plurality of distances between the boundary of the block and a respective location of a plurality of locations represented by the location data; and
    combining the plurality of distances to approximate the area.

3. The method according to claim 1, wherein the boundary is a lower boundary of the block.

4. The method according to claim 1, comprising normalizing the area based on a scaling factor representative of a scaling applied to the image.

5. The method according to claim 1, wherein identifying the location data indicative of the read path comprises identifying location data indicative of a curved read path for the image processing operation.

6. The method according to claim 1, wherein the image processing operation comprises a distortion processing operation to alter a distortion of the image, the image comprising a plurality of blocks of pixels including the block at least partly traversed by the read path.

7. The method according to claim 1, comprising, before identifying the location data, identifying, in raster order, at least one previous set of location data, each corresponding to a respective previous read path at least partly traversing the block.

8. The method according to claim 1, wherein the location data is representative of at least one location at which a respective pixel value is to be calculated based on the block data.

9. The method according to claim 1, comprising associating the storage prioritization data with the block after reading data from the storage in accordance with the read path.

10. The method according to claim 1, comprising, after reading the block data from the storage in accordance with the read path, generating an unlock signal indicative that the block data is evictable from the storage.

11. A storage management system for communicating with storage for an image processing operation, the storage management system comprising at least one processor configured to:
    identify location data indicative of a read path for the image processing operation, the read path at least partly traversing a block of pixels of an image such that the read path divides the block into a first portion on a first side of the read path and a second portion on a second side of the read path;
    generate, from the location data, parameter data relating to an area of the first portion of the read path, between a boundary of the block and the read path; and
    associate storage prioritization data with the block at least partly on the basis of the parameter data, the storage prioritization data being for determining whether block data representative of the block is to be evicted from the storage.

12. The storage management system according to claim 11, wherein the storage is a cache memory of the storage management system for storage of the block data after retrieval of the block data from further storage during the image processing operation, and from which the block data is evictable during the image processing operation.

13. The storage management system according to claim 12, wherein the further storage is main memory of an image processing system operable to implement the image processing operation.

14. The storage management system according to claim 11, comprising a storage controller operable to receive the storage prioritization data after reading of the block data from the storage in accordance with the read path.

15. The storage management system according to claim 11, comprising a storage controller operable to:
    receive an unlock signal indicative that the block data is evictable from the storage;
    reduce at least one further storage prioritization value for further storage prioritization data representative of at least one further block of pixels of the image.

16. The storage management system according to claim 15, wherein reducing the storage prioritization value comprises performing a bit shift operation on the storage prioritization data.

17. The storage management system according to claim 11, comprising a storage controller operable to determine whether the block data is to be evicted from the storage at least partly on the basis of the storage prioritization data.

18. The storage management system according to claim 17, comprising a storage control structure for storing the storage prioritization data and block identifier data indicative of the block the storage prioritization data is associated with.

19. The storage management system according to claim 17, wherein the storage controller is operable to determine whether the block data is to be evicted from the storage by a method comprising:
    determining that a storage prioritization value represented by the storage prioritization data is smaller than further storage prioritization values represented by further storage prioritization data associated with at least one further block represented by further block data stored in the storage; and in response, determining that the block data is to be evicted.

20. The storage management system according to claim 17, wherein the storage controller is operable to determine whether the block data is to be evicted from the storage in response to:
   receiving further data; and
   identifying that a size of the further data is larger than an available storage capacity of the storage.

* * * * *